Oct. 3, 1933.         G. FLINTERMANN          1,928,814
                   ADJUSTABLY SUPPORTED SEAT
                Filed March 31, 1931       2 Sheets-Sheet 1.
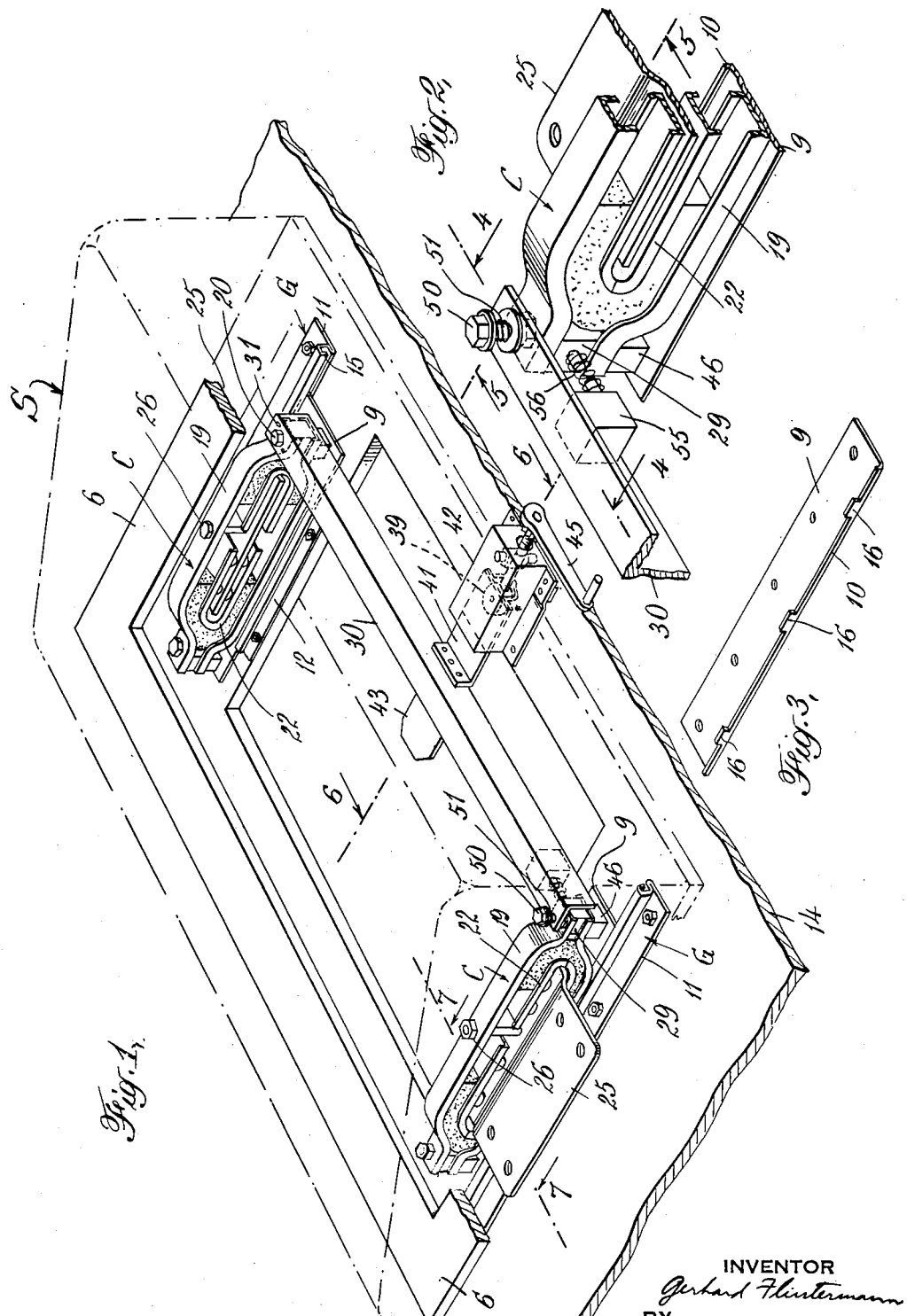
INVENTOR
Gerhard Flintermann
BY
Pennie, Davis, Marvin & Edmonds
HIS ATTORNEY

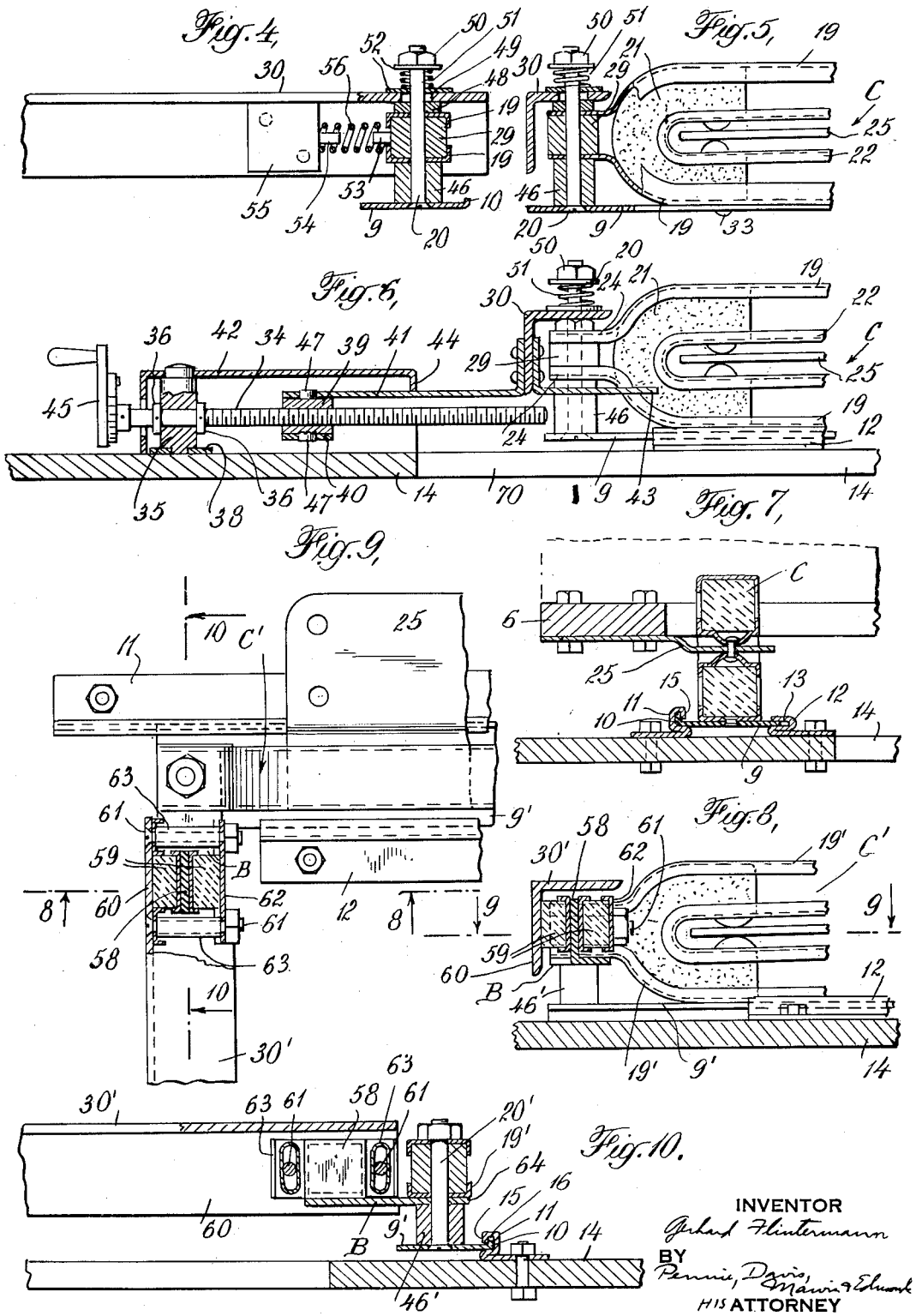

Patented Oct. 3, 1933

1,928,814

UNITED STATES PATENT OFFICE 1,928,814

ADJUSTABLY SUPPORTED SEAT

Gerhard Flintermann, West Orange, N. J.

Application March 31, 1931. Serial No. 526,583

7 Claims. (Cl. 155—14)

This invention relates to seats and has for an object the provision of improved means for mounting seats. More particularly, the invention contemplates the provision of improved supporting and adjusting means for seats.

In one of its aspects, the invention is particularly applicable to vehicles in which it is desirable to provide adjustable seats for varying the leg room provided. Thus, the invention provides improved means for adjusting the positions of automobile front seats by moving the seats rearwardly and forwardly, or, in opposite directions longitudinally of the automobile body.

Apparatus embodying the invention comprises generally means mounted for sliding movement in guide members disposed adjacent the ends of the seat and cushioning members disposed between such means and the seat proper. In my copending application, Serial No. 521,484, filed March 10, 1931, I have disclosed an adjustably mounted seat of this type. It is the object of the present invention to provide improved means for connecting the sliding parts of the seat supporting structure in such a manner that such parts will not bind in their guide means even if the guide means are not disposed in exactly parallel relation. It is a further object of the invention to provide a seat supporting structure of the type described in which means are provided to prevent excessive lateral tilting of the cushioning elements disposed between the seat proper and the supporting structure. The invention further includes improved operating mechanism for moving the seat on its guides.

The above and other objects of my invention may be carried out by respectively securing suitable slide means to a seat or seat frame adjacent the opposite ends thereof and respectively disposing such slide means in spaced guides fixed to the floor boards of an automobile or any other rigid support, at least one of the slide means being so mounted on the seat or seat frame as to permit a limited relative movement between the two slide means in the plane of movement of the seat. This limited relative movement permits the slides to adapt themselves without binding to guides which, because of an error in construction or otherwise, are not disposed in precisely parallel relationship. In accordance with one embodiment of the invention, a resilient non-metallic cushioning element is disposed in supporting relationship between the seat and the fixed support, and it is preferred to dispose at least one such element in supporting relationship between the seat and each slide means. When such cushioning elements are employed, it is preferred to provide at least one cross member connecting the members of the opposite cushioning elements which are secured to the slide means, whereby any tendency toward tilting of the cushioning elements is avoided. The cushioning elements employed may be of the type described and claimed in my Patents Nos. 1,732,646 and 1,732,647, or other types of cushioning elements may be used.

The invention will be best understood from a consideration of the following description in conjunction with the accompanying drawings, in which:

Figure 1 is a perspective view of my improved seat supporting structure as applied to an automobile seat, certain of the parts being broken away to show the details of construction;

Fig. 2 is an enlarged perspective view of the means for yieldably attaching a cross member to a cushioning element;

Fig. 3 is a perspective view of one of the slide plates employed in the seat shown in Fig. 1;

Fig. 4 is a sectional view taken along the line 4—4 of Fig. 2 and viewed in the direction of the arrows;

Fig. 5 is a sectional view taken along the line 5—5 of Fig. 2 and viewed in the direction of the arrows;

Fig. 6 is a sectional view taken along the line 6—6 of Fig. 1 and viewed in the direction of the arrows;

Fig. 7 is a sectional view of the seat supporting structure;

Fig. 8 is a view, similar to Fig. 5, showing a modified form of means for yieldably securing a cross member to a cushioning element, this view being taken along the line 8—8 of Fig. 9;

Fig. 9 is a plan view, partly in section, taken along the line 9—9 of Fig. 8; and Fig. 10 is a sectional view taken along the line 10—10 of Fig. 9 and viewed in the direction of the arrows;

Referring to the drawings, the seat proper, indicated by the broken lines S in Fig. 1, is supported by a frame 6 which may be formed of wood or any other suitable material. In the disclosed embodiment of the invention, the seat S is mounted for sliding movement on the base structure 14 which may comprise the usual floor boards of an automobile.

A pair of substantially parallel guides G are mounted on the base structure 14. Each guide G comprises a pair of parallel sheet metal members 11 and 12, each having a base engaging portion and a groove forming portion as shown. The grooves 13 formed by the members 11 and 12 are oppositely disposed and the member 11 has a downwardly turned edge 15 which partly closes the groove 13 therein as shown in Figs. 7 and 10.

A slide plate 9 which carries one end of the seat slidably engages the oppositely disposed grooves 13 of each set of guide members 11 and 12. The outer edge of each plate 9 is turned upwardly as shown at 10 and is provided with a plurality of spaced upwardly extending projections 16, as clearly shown in Fig. 3. The upturned edges 10 and projections 16 of the slide plates 9 fit behind down-turned edges 15 of the corresponding guide members 11, and in this manner, each slide plate is prevented from binding in its inner guide member 12.

The seat frame 6 is preferably connected to the two slidable supports 9 through two cushioning elements C. Each cushioning element comprises a pair of channel-shaped metal members 19 attached together at their ends by means of the bolts 20 to form an annular ring. A soft rubber core 21 is seated within the annular ring thus formed between the side walls of the channel-shaped members, and an annular sheet metal core 22 having a grooved outer surface is mounted within the opening in the soft rubber core. The rubber core 21 may be conveniently formed of two U-shaped members having their ends spaced apart, and each part of such core may have a horizontal length substantially equal to its overall height.

The lower channel-shaped member 19 of each cushioning element C is suitably secured to one of the slide plates 9. As shown, the flat lower portion of the member 19 is preferably fixed to the plate 9 by rivets or equivalent means 33 and a block 46 is disposed between each raised end portion 24 of the member 19 and the upper surface of the plate 9, the end bolt 20 passing through both the block 46 and the plate 9, as shown in Fig. 5.

A sheet metal plate 25 is attached at one end to the inner sheet metal core 22 of the cushioning element C, and at its other end to the under surface of the seat frame 6, as shown in Figs. 1 and 7.

The upper and lower channel-shaped members 19 of the cushioning elements C are held together by a centrally disposed bolt 26, preferably provided with a spacing sleeve which holds the members 19 in the proper spaced relation. The central bolt 26 may pass through an opening in the slide plate 9. A block 29 is disposed between each of the end portions 24 of the members 19 to maintain these end portions in proper spaced relation.

In order that the outer members 19 of the two cushioning elements C and the slide plates 9 fixed thereto may be united in a single structure, and further, in order to prevent the lateral tilting of the cushioning elements when side thrusts are imposed upon the seat, corresponding end portions of the two elements C are connected by at least one frame member such as the angle iron 30. The angle iron 30 is preferably rigidly connected to one of the elements C by the bolt 20 and a rivet or equivalent means 31. As hereinbefore mentioned, it is desired to so connect the guide engaging plates that they will not bind in the guides even if the guides are not exactly parallel. To this end, the angle iron 30 is connected to the other cushioning element through a joint permitting a limited degree of relative movement between these elements in the plane of movement of the seat.

In the form of the invention illustrated in Figs. 1 through 6, spring means are interposed between one end of the angle iron 30 and one of the cushioning elements C to give the desired yieldable connection. Thus, the bolt 20 which connects the front end of the right hand element C to the slide plate 9 is provided with a nut 48 which engages the upper surface of the upper outer member 19, and this bolt passes through an enlarged opening 49 in the angle iron 30, as shown in Fig. 4. A nut 50 is threaded on the upper end of the bolt 20 and a heavy compressed coiled spring 51 is interposed between the nut 50 and upper surface of the angle iron 30, washers 52 being provided at the ends of the spring. An inwardly directed horizontal stud 53 is fixed to or formed integral with the block 29 and a similar oppositely directed stud 54 is provided on a block 55 fixed to the angle iron 30. A compressed coiled spring 56 is carried on the studs 53 and 54 between the blocks 29 and 55.

With the described construction, the forward end of the right hand cushioning element C may move to a limited extent toward and away from the forward end of the left hand cushioning element in the plane of movement of the seat structure, and the right hand element may move slightly about the bolt 20 as a pivot. Thus, the slide plates 9 fixed to the cushioning elements C have a limited universal relative movement in the plane of movement of the seat. With this arrangement, if, because of careless or inaccurate assembly of the guides G on the floor structure 14, these guides are not precisely parallel, the seat structure will nevertheless move forwardly and rearwardly without binding in its guides. At the same time, the cross member 30 will prevent any appreciable lateral tilting of the cushioning elements C as the result of lateral forces on the seat.

The yieldable connection between the cross member and one of the cushioning elements may of course be disposed at either side of the seat, and various forms of yieldable connections other than that shown in Figs. 1 through 6 may be used. Thus, as shown in Figs. 8, 9 and 10, a non-metallic resilient connection may be interposed between the angle iron 30' and the right hand cushioning element C'. In the disclosed embodiment, the up-standing portion 58 of a bracket B is disposed between two rubber blocks 59 which are compressed and clamped to the vertical portion 60 of the angle iron 30' by means of the bolts 61 and the plate 62, suitable spacers 63 being provided on the bolts 61 to limit the compression of the rubber blocks. The flat portion 64 of the bracket B extends outwardly beyond the end of the angle iron 30' and may be fixed to the cushioning element C' between the block 46' and the lower outer member 19', the bolt 20' effecting this connection. It will be clear that the rubber blocks 59 permit a limited universal relative movement between the cross member 30' and the cushioning element C', and in this manner, the desired limited movement between the slide plates 9' in the plane of movement of the seat is provided for.

The seat structure is preferably adjustably shifted by means of a shaft drive mechanism. Thus, as shown in Figs. 1 and 6, the screw threaded shaft 34 is journaled in a transverse opening through a stud 35, thrust collars 36 being provided on the shaft on both sdies of the stud to prevent axial movement of the shaft through the stud. The stud 35 is journaled for movement about a vertical axis in the housing 42 and the cross bar 38 which parts may be secured to the base structure 14 by suitable means. The shaft 34 extends outwardly through an opening in the front plate of the housing 42 and a crank or operating handle 45 is suitably connected to this front extension of the shaft. The crank 45 is arranged to drive the shaft 34 through a reversible ratchet mechanism of any suitable type. The ratchet mechanism described and claimed in my copending application, Serial No. 361,403, filed May 8, 1929 is suitable for this purpose, the arrangement being such that the screw 34 may be rotated in either direction by moving the crank 45 through an arc above the base 14.

A nut 93 threadedly engages the shaft 34 and is attached by a strap 40 or otherwise to one end of a bar 41, the other end of which is fixed to the angle iron 30 at substantially its midpoint, as shown in Fig. 1. The nut 39 is preferably circular and is provided with axially disposed circular lugs or trunnions 47 on its upper and lower surfaces, as shown in Fig. 6. The strap 40 is so disposed as to clear the lateral surfaces of the nut 39, and the trunnions 47 are journaled respectively in the bar 41 and the strap 40. With this arrangement, a pivotal connection is provided both between the threaded shaft 34 and the operating bar 41 which is fixed to the seat, and between the shaft 34 and the fixed support 14, and the binding of the shaft in the nut 39 or the stud 35 due to twisting of the seat in its guides is effectively prevented. The housing 42 is open at its rearward or inner end but is provided at this point with a downwardly disposed lip or flange 44 which engages and acts as a guide for the seat operating bar 41. A guard plate 43 is suitably mounted to overlie and protect the rearward end of the screw threaded shaft 34 and as shown, this plate may be fixed to the angle iron 30. The plate 43 protects the screw threads on the shaft 34 from injury by tools or other objects dropped through the seat frame 6 and the opening 70 in the base structure 14.

I claim:

1. In a device of the class described, a fixed support, a seat, a pair of spaced substantially parallel guides mounted on said support, a pair of spaced slides attached to said seat and respectively engaging said guides, resilient means interposed in supporting relationship between each slide and the seat, a transverse frame member connecting said slides and a yieldable connection between said frame member and at least one of said slides whereby said slides may move with respect to each other to a limited extend in the plane of movement of the seat.

2. In a device of the class described, a fixed support, a seat, a pair of substantially parallel guides mounted on said support, a vertically extending cushioning element adjacent each guide, each of said cushioning elements comprising two relatively movable yieldably connected parts, a slide engaging each guide and fixed to one member of the corresponding cushioning element, means connected between the other member of each cushioning element and the seat, a transverse frame member connecting the members of the two cushioning elements which are fixed to the slides and attached to said members at points remote from the vertical extremities of the cushioning elements and a yieldable connection between said frame member and at least one of said cushioning elements whereby said slides may move with respect to each other to a limited extent in the plane of movement of said seat.

3. In a device of the class described, a fixed support, a seat, a pair of spaced parallel guides mounted on said support, a vertically extending cushioning element adjacent each of said guides, each of said cushioning elements comprising two relatively movable yieldably connected parts, a slide mounted in each of said guides and connected to one part of the adjacent cushioning element, means connected between the other part of each cushioning element and said seat, transverse bracing means connecting the parts of the two cushioning elements which are connected to said slides and engaging said parts at points remote from the vertical extremities of said cushioning elements and a yieldable connection between at least one of said parts of said cushioning elements and said transverse bracing means whereby said slides may move with respect to each other to a limited extent in the plane of movement of said seat.

4. In a device of the class described, a fixed support, a seat, a pair of spaced substantially parallel guides mounted on said support, a vertically extending cushioning element adjacent each of said guides, each of said cushioning elements comprising two relatively movable yieldably connected parts, a slide mounted in each of said guides and connected to one part of the adjacent cushioning element, cooperating means on said guides and said slides for maintaining each slide parallel to its guide, means connected between the other part of each cushioning element and said seat, a cross frame member extending between the parts of said cushioning elements which are connected to said slides and engaging said parts at points remote from the vertical extremities of said cushioning elements, means for rigidly connecting said cross frame member to one of said parts and means for yieldably connecting said cross frame member to the other of said parts whereby said slides may move with respect to each other to a limited extent in the plane of movement of said seat.

5. In a device of the class described, a fixed support, a seat, a pair of spaced substantially parallel guides mounted on said support, a vertically extending cushioning element adjacent each of said guides, each of said cushioning elements comprising two relatively movable yieldably connected parts, a slide mounted in each of said guides and connected to one part of the adjacent cushioning element, cooperating means on said guides and said slides for maintaining each slide parallel to its guide, means connected between the other part of each cushioning element and said seat, a cross frame member extending between the parts of said cushioning elements which are connected to said slides and engaging said parts at points remote from the vertical extremities of said cushioning elements, means for rigidly connecting said cross frame member to one of said parts and spring means for yieldably connecting said cross frame member to the other of said parts whereby said slides may move with respect to each other to a limited extent in the plane of movement of said seat on said guides.

6. In a device of the class described, a fixed support, a seat, a pair of spaced substantially parallel guides mounted on said support, a vertically extending cushioning element adjacent each of said guides, each of said cushioning elements comprising two relatively movable yieldably connected parts, a slide mounted in each of said guides and connected to one part of the adjacent cushioning element, cooperating means on said guides and said slides for maintaining each slide parallel to its guide, means connected between the other part of each cushioning element and said seat, a cross frame member extending between the parts of said cushioning elements which are connected to said slides and engaging said parts at points remote from the vertical extremities of said cushioning elements, means for rigidly connecting said cross frame member to one of said parts and non-metallic resilient means for yieldably connecting said cross frame member to the other of said parts whereby said slides may move with respect to each other to a limited extent in the plane of movement of said seat on said guides.

7. In a device of the class described, a fixed support, a seat, a pair of spaced substantially parallel guides mounted on said support, a pair of spaced slides attached to said seat and respectively engaging said guides, cooperating means on said guides and said slides for maintaining each slide parallel to its guide, resilient means interposed in supporting relationship between each slide and the seat, a frame member connecting said slides, a yieldable connection between said frame member and at least one of said slides whereby said slides may move with respect to each other to a limited extent in the plane of movement of the seat, journal means pivotally connected to said fixed support, a threaded shaft journaled in said journal means, means for preventing axial movement of said shaft relative to said journal means, a nut threadedly engaging said shaft and means for pivotally connecting said nut to said frame.

GERHARD FLINTERMANN.